(12) United States Patent
Mizrahi et al.

(10) Patent No.: US 6,894,838 B2
(45) Date of Patent: May 17, 2005

(54) EXTENDED BANDWIDTH MIRROR

(75) Inventors: Victor Mizrahi, Anapolis, MD (US); Ligang Wang, Rochester, NY (US)

(73) Assignee: Semrock, Inc., Rochester, NY (US)

( * ) Notice: Subject to any disclaimer, the term of this patent is extended or adjusted under 35 U.S.C. 154(b) by 0 days.

(21) Appl. No.: 10/426,228

(22) Filed: Apr. 30, 2003

(65) Prior Publication Data

US 2004/0047055 A1 Mar. 11, 2004

Related U.S. Application Data

(60) Provisional application No. 60/409,170, filed on Sep. 9, 2002.

(51) Int. Cl.$^7$ .................................................. G02B 1/10
(52) U.S. Cl. ...................... 359/584; 359/587; 359/589; 359/883
(58) Field of Search .................... 359/584, 586, 359/587, 588, 589, 883, 884

(56) References Cited

U.S. PATENT DOCUMENTS

| | | | | |
|---|---|---|---|---|
| 5,448,404 A | * | 9/1995 | Schrenk et al. ............. | 359/584 |
| 6,407,862 B2 | * | 6/2002 | Moshrefzadeh ............. | 359/584 |
| 6,462,878 B1 | | 10/2002 | Kartner et al. .............. | 359/588 |
| 6,535,336 B2 | * | 3/2003 | Tatsumi ...................... | 359/584 |
| 6,667,095 B2 | * | 12/2003 | Wheatley et al. ........... | 428/212 |
| 2002/0060847 A1 | * | 5/2002 | Joannopoulos et al. ..... | 359/584 |

OTHER PUBLICATIONS

Press Release dated Jan. 21, 2003; "Semrock Announces Availability of the new MaxMirror" www.semrock.com.

* cited by examiner

*Primary Examiner*—Fayez G. Assaf
(74) *Attorney, Agent, or Firm*—Grossman, Tucker, Perreault & Pfleger, PLLC

(57) ABSTRACT

A dielectric mirror including a substrate and a reflector portion disposed directly on the substrate. The reflector portion includes alternating layers, e.g. in excess of 150 alternating layers, of high and low index of refraction material. In one embodiment, the layers are configured for reflecting each wavelength in a bandwidth of 400 nm at greater than 97.5% reflectivity. In another embodiment, the layers are configured for reflecting an s-polarization and p-polarization of each wavelength in the range from 350 nm to 100 nm at greater than 98% reflectivity. High reflectivity is achieved for a wide range of angle of incidence.

32 Claims, 8 Drawing Sheets

EXTENDED BANDWIDTH MIRROR

CROSS REFERENCE TO RELATED APPLICATIONS

The present application claims the benefit of the filing date of U.S. Provisional Application No. 60/409,170, filed Sep. 9, 2002 the teachings of which are incorporated herein by reference.

FIELD OF THE INVENTION

The present invention relates in general to reflective devices, and in particular to thin film mirrors useful, for example, in laser systems.

BACKGROUND OF THE INVENTION

Conventionally, laser mirrors have been constructed from multiple layers of two or more dielectric materials having different refractive indices. Each layer is very thin, i.e. having an optical thickness (physical thickness times the refractive index of the layer) on the order of order of ¼ wavelength the light to be reflected in the application. The layers may be deposited on a substrate to provide a high reflectance region extending over a limited range of wavelengths.

It has been recognized that dielectric mirrors provide both a higher reflectance and higher laser damage threshold than more conventional metal mirrors. A major disadvantage associated with conventional dielectric mirrors, however, is that they do not have sufficiently broadband reflectance zones to allow use in connection with the range of laser wavelengths used in certain optical systems. As such, conventional dielectric mirrors must be changed each time a laser with a wavelength outside of the mirror's reflectance zone is used, or to accommodate use of the entire range of a multi-wavelength or tunable device such as a Nd:YAG, Ti-Sapphire, or a dye laser.

It is well known, for example, that an Nd: YAG laser has fundamental and harmonic wavelengths of 1064 nm, 532 nm, and 0.355 nm. Conventionally, it has not been possible to provide a single dielectric mirror that provides high reflectivity of all polarization states in this range of fundamental and harmonic frequencies, plus all wavelengths in between. Thus, separate mirrors have been necessary depending on the selected laser wavelength. Also, many Ti:Sapphire lasers are utilized in "two-photon" fluorescence measurement systems, in which the laser excites a fluorescent sample at a wavelength between about 700 and 1100 nm, and the fluorescence at a wavelength just longer than half the excitation wavelength is measured. Because of the low light levels involved, the sensitivity of such a system is severely limited by the difficulty of attaining a single mirror that directs both the excitation and the fluorescence light.

Attempts have been made to increase the width of the high reflectance zone in a dielectric mirror through use of a chirped stack. In a chirped stack, the thicknesses of the layers in the stack are gradually increased so that the summation of the reflections from the individual interfaces adds up to a large reflectance for a wide range of wavelengths. Despite use of chirped stacks, deposition processes used for depositing the thin-film layers have provided practical limitations to producing mirrors with high reflectance over a broad range of wavelengths.

In a typical deposition process, the surface roughness of the individual layers increases with layer count to the point where the reflection decreases to well below 99%. In addition, random thickness errors that occur during deposition can also reduce reflectance over a portion of the spectral region. Conventionally, layer thickness errors have been reduced through optical monitoring. However, mirrors having high reflectance/low transmittance over a wide range of wavelengths make optical monitoring in conventional deposition systems difficult.

Accordingly, there is a need for a mirror having a high reflectance for all polarization states over a wavelength range spanning the operating wavelengths of a variety of conventional lasers. There is also a need for a mirror having such properties over a wide angle of incidence.

SUMMARY OF THE INVENTION

According to one aspect of the invention, there is provided a mirror including a substrate and a reflector portion disposed directly on a surface of the substrate. The reflector portion includes alternating layers of high and low index of refraction material configured for reflecting greater than 99% of all wavelengths in a bandwidth of greater than 400 nm at greater than 97.5% reflectivity. The bandwidth includes at least one wavelength in the range from 350 nm to 1100 nm. In one embodiment, the layers are configured for reflecting greater than 99% of all wavelengths in the range from 400 nm to 1100 nm at greater than 98% reflectivity at a plurality of angles of incidence for each wavelength.

According to another aspect of the invention, the reflector portion of a mirror consistent with the invention includes in excess of 150 alternating layers of high and low index of refraction dielectric material. A first one of the high index of refraction materials alternates with the low index of refraction material adjacent the substrate, and a second one of the high index of refraction materials alternates with the low index of refraction material adjacent a top surface of the reflector portion. The layers are configured for reflecting an s-polarization and p-polarization of greater than 99% of all wavelengths in a bandwidth of greater than 400 nm at greater than 97.5% reflectivity.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

The present invention will be described herein in connection with various exemplary embodiments thereof. Those skilled in the art will recognize that the features and advantages of the present invention may be implemented in a variety of configurations. It is to be understood, therefore, that the embodiments described herein are presented by way of illustration, not of limitation.

Conventional reflecting mirrors have been configured as dielectric mirrors having high reflectivity over a relatively narrow (e.g. less than or equal to 400 nm) band of wavelengths associated only with, for example, one operating frequency of the laser 100, or associated with only one laser system. An Nd: YAG laser, for example, has fundamental and harmonic frequencies of 1064 nm, 532 nm and 355 nm. No known conventional dielectric mirror provides high reflectivity for all polarization states over the range of 355 nm to 1064 nm, which covers the fundamental and harmonic frequencies of an Nd:YAG laser and all wavelengths in between. Accordingly, the reflecting mirror in a laser system has conventionally been selected so that its relatively narrow high reflectivity bandwidth corresponds to the selected laser operating frequency. This has required use of different reflecting mirrors over the wide range of wavelengths produced by the laser.

Advantageously, however, a mirror consistent with the present invention may be configured in one embodiment to provide high reflectivity, e.g. greater than 98% and typically greater than 99%, for all polarization states over a heretofore unattained wide bandwidth greater than 400 nm. Greater than 99% of the wavelengths in such wide bandwidth may be reflected with high reflectivity. In one embodiment the high reflectivity bandwidth for a mirror consistent with the invention may extend from 400 nm to 1100 nm. In another embodiment consistent with the invention a reflecting mirror 104 may be configured to provide 99% reflectivity for all polarization states over an even broader bandwidth extending from 350 nm to 1100 nm. Mirrors consistent with the invention also provide high reflectivity and broad bandwidth over a wide angle of incidence (AOI) from 0 degrees (i.e. normal to the mirror surface) to 50 degrees. Providing high reflectivity over these broad bandwidths greatly simplifies optical system design by allowing use of a single reflecting mirror, thereby reducing cost and increasing efficiency compared to the prior art.

Figure 1:
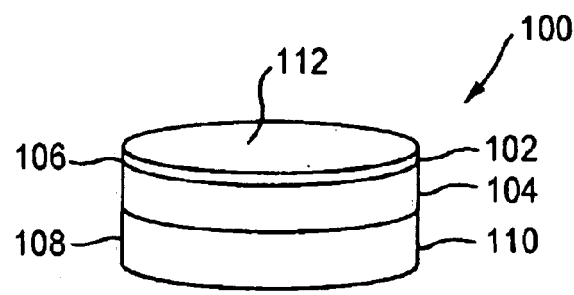
FIG. 1: is a schematic illustration of an exemplary mirror consistent with the invention.

Turning now to FIG. 1 there is illustrated one embodiment 100 of a mirror consistent with the invention. Again, although a mirror consistent with the invention has particular utility as a reflector mirror in a laser system, e.g. in system 100, such mirrors have utility in a wide variety of optical systems. The exemplary embodiment 100 illustrated in FIG. 1 includes a reflector portion 102 deposited directly on a first surface 106 of a substrate 104. The mirror is intended for reflecting light imparted on a reflecting surface 112 of the reflector portion 102. An optional compensating layer 108 may be deposited on the opposite side 110 of the substrate 104, as discussed below. In one embodiment, the substrate may be a silica or borosilicate crown glass (BK7) substrate. Those skilled in the art will, however, recognize that other substrate materials that may be used in a mirror consistent with the invention.

Figure 2:
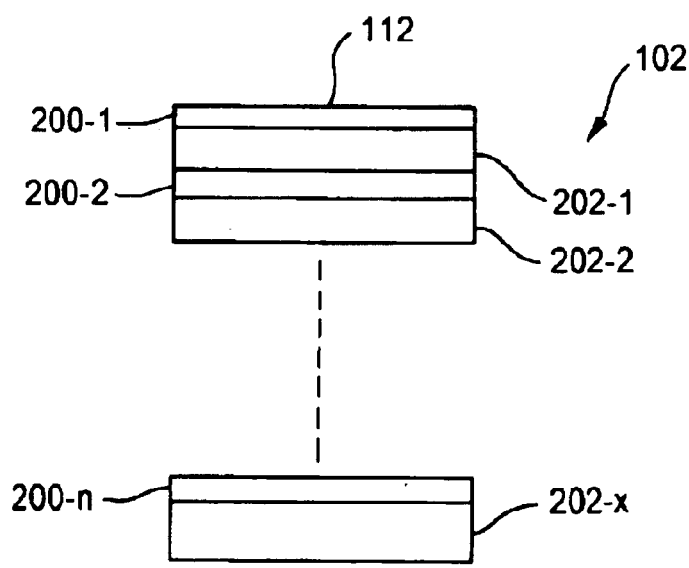
FIG. 2: is a schematic illustration of alternating layers of high and low index of refraction material for a reflector portion of the mirror illustrated in FIG. 1.

Advantageously, the reflector portion 102 is formed from hard coatings. With reference also to FIG. 2, for example, the reflector portion may be formed by depositing alternating hard coating layers of high 200-1, 200-2 . . . 200-n and low 202-1, 202-2 . . . 202-x index of refraction material. A variety of hard coating materials that may be used as the high and low index of refraction layers are known to those skilled in the art. Exemplary hard coating materials include: $SiO_2$ (refractive index 1.5); $TiO_2$ (refractive index 2.4); $Ta_2O_5$ (refractive index 2.1); $Nb_2O_5$ (refractive index 2.3); and $HfO_2$ (refractive index 2.0).

It is to be understood that the terms "high index of refraction" and "low index of refraction" are used herein to indicate a relative difference between the two layers of material (high and low), and, do not necessarily indicate a particular range of indexes. Thus, each high index of refraction layer need only have an index of refraction which is numerically higher than the low index of refraction layer adjacent thereto. The numerical differences between the index of refraction in the high and low index of refraction materials affects the number of layers required for forming a mirror with a particular reflectance characteristic. Generally, a small difference between the indices of refraction in the high and low index materials, requires a higher number of alternating layers to achieve a particular reflectance than would be required with a larger difference.

In a preferred embodiment, the alternating high and low index hard coating layers are deposited using ion-assisted ion beam sputtering. In order to reproducibly make filters with hard coating layers, given that the deposition rate in most deposition systems may vary with time, it is useful to use a thickness monitoring technique. Such techniques include optical monitoring, wherein the transmission and/or reflection of light by the layers being deposited is used to estimate the optical thickness of the layers, and crystal monitoring, wherein the resonant oscillation frequency of a crystal exposed to the depositing material is correlated to its increasing mass and therefore deposition rate. However, in ion-beam sputtering systems the deposition rate can be remarkably stable, thereby minimizing random layer thickness errors. In addition, ion beam sputtering produces layers having lower surface roughness than other deposition techniques, allowing for thicker coatings. Thus, when such a machine is running well the hard coating layers may be deposited by calculating the thickness desired for each layer, assuming a deposition rate for each material, and then using the resulting deposition time to determine when to cut each layer (a "timing" technique).

Each of the high index of refraction layers 200-1, 200-2 . . . 200-n and low index of refraction layers 202-1, 202-2 . . . 202-x has an associated optical thickness, defined by the product of its physical thickness times its refractive index. Although the embodiments shown in the drawings are not drawn to scale, the hard coating layers illustrated in FIG. 2 may have, for example, an optical thickness of about one quarter of a wavelength that is highly reflected by the mirror. Depending on desired transmission characteristics, however, non-quarter-wave optical thicknesses and/or varying optical thicknesses may also be provided.

It has been found that to achieve high reflectivity over a bandwidth extending from, for example, 390 nm to 1100 nm or broader, it is necessary to deposit a high number of layers compared to prior art mirrors. In particular, the reflector portion 102 of a mirror consistent with the invention may include in excess of 150 alternating high and low index layers. This can result in a reflector portion having thickness on the order of 16–18 microns.

Table 1 below illustrates the specific layer structure for an exemplary embodiment of a reflector portion 102 of a mirror consistent with the invention including 169 alternating hard coating layers of tantalum pentoxide ($Ta_2O_5$, index of about 2.1) and silicon dioxide ($SiO_2$, index of about 1.5) deposited on a BK7 glass substrate. The identified layers were deposited using a timing technique and an ion-assisted, ion-beam sputtering vacuum system.

|  | Mat | Thickness (nm) |
| --- | --- | --- |
| 1 | Ta2O5 | 130.03 |
| 2 | SiO2 | 209.27 |
| 3 | Ta2O5 | 124.92 |
| 4 | SiO2 | 199.43 |
| 5 | Ta2O5 | 158.9 |
| 6 | SiO2 | 198.31 |
| 7 | Ta2O5 | 181.92 |
| 8 | SiO2 | 216.74 |
| 9 | Ta2O5 | 126.52 |
| 10 | SiO2 | 185.18 |
| 11 | Ta2O5 | 141.51 |
| 12 | SiO2 | 207.56 |
| 13 | Ta2O5 | 176.26 |
| 14 | SiO2 | 202.69 |
| 15 | Ta2O5 | 115.22 |
| 16 | SiO2 | 200.96 |
| 17 | Ta2O5 | 132.86 |
| 18 | SiO2 | 201.74 |
| 19 | Ta2O5 | 121.36 |
| 20 | SiO2 | 194.21 |
| 21 | Ta2O5 | 132.84 |
| 22 | SiO2 | 191.08 |
| 23 | Ta2O5 | 135.77 |
| 24 | SiO2 | 197.37 |
| 25 | Ta2O5 | 135.71 |
| 26 | SiO2 | 192.86 |
| 27 | Ta2O5 | 127.54 |
| 28 | SiO2 | 185.8 |
| 29 | Ta2O5 | 128.17 |
| 30 | SiO2 | 188.3 |
| 31 | Ta2O5 | 128.39 |
| 32 | SiO2 | 194.45 |
| 33 | Ta2O5 | 115.27 |
| 34 | SiO2 | 178.18 |
| 35 | Ta2O5 | 113.59 |
| 36 | SiO2 | 171.93 |
| 37 | Ta2O5 | 105.97 |
| 38 | SiO2 | 173.94 |
| 39 | Ta2O5 | 120.05 |
| 40 | SiO2 | 181.77 |
| 41 | Ta2O5 | 113.9 |
| 42 | SiO2 | 179.02 |
| 43 | Ta2O5 | 112.59 |
| 44 | SiO2 | 171.96 |
| 45 | Ta2O5 | 110.02 |
| 46 | SiO2 | 161.92 |
| 47 | Ta2O5 | 111.81 |
| 48 | SiO2 | 171.62 |
| 49 | Ta2O5 | 99.14 |
| 50 | SiO2 | 153.03 |
| 51 | Ta2O5 | 91.67 |
| 52 | SiO2 | 160.26 |
| 53 | Ta2O5 | 115.49 |
| 54 | SiO2 | 169.18 |
| 55 | Ta2O5 | 123.54 |
| 56 | SiO2 | 164.8 |
| 57 | Ta2O5 | 90.24 |
| 58 | SiO2 | 161.74 |
| 59 | Ta2O5 | 113.95 |
| 60 | SiO2 | 159.04 |
| 61 | Ta2O5 | 95.7 |
| 62 | SiO2 | 146.95 |
| 63 | Ta2O5 | 85.33 |
| 64 | SiO2 | 144.05 |
| 65 | Ta2O5 | 90.7 |
| 66 | SiO2 | 160.66 |
| 67 | Ta2O5 | 103.69 |
| 68 | SiO2 | 148.55 |
| 69 | Ta2O5 | 94.26 |
| 70 | SiO2 | 131.54 |
| 71 | Ta2O5 | 88.84 |
| 72 | SiO2 | 137.44 |
| 73 | Ta2O5 | 90.95 |
| 74 | SiO2 | 140.56 |
| 75 | Ta2O5 | 103.4 |
| 76 | SiO2 | 132.32 |
| 77 | Ta2O5 | 87.75 |
| 78 | SiO2 | 150.06 |
| 79 | Ta2O5 | 93.23 |
| 80 | SiO2 | 130.93 |
| 81 | Ta2O5 | 91.93 |
| 82 | SiO2 | 126.59 |
| 83 | Ta2O5 | 86.9 |
| 84 | SiO2 | 136.54 |
| 85 | Ta2O5 | 84.03 |
| 86 | SiO2 | 114.51 |
| 87 | Ta2O5 | 87.27 |
| 88 | SiO2 | 127.68 |
| 89 | Ta2O5 | 80.41 |
| 90 | SiO2 | 104.73 |
| 91 | Ta2O5 | 82.4 |
| 92 | SiO2 | 134.03 |
| 93 | Ta2O5 | 80.05 |
| 94 | SiO2 | 112.3 |
| 95 | Ta2O5 | 75.28 |
| 96 | SiO2 | 103.85 |
| 97 | Ta2O5 | 83.31 |
| 98 | SiO2 | 120.96 |
| 99 | Ta2O5 | 80.09 |
| 100 | SiO2 | 125.42 |
| 101 | Ta2O5 | 84.97 |
| 102 | SiO2 | 123.1 |
| 103 | Ta2O5 | 69.55 |
| 104 | SiO2 | 115.61 |
| 105 | Ta2O5 | 70.97 |
| 106 | SiO2 | 102.76 |
| 107 | Ta2O5 | 87.47 |
| 108 | SiO2 | 93.58 |
| 109 | Ta2O5 | 58.98 |
| 110 | SiO2 | 104.17 |
| 111 | Ta2O5 | 68.76 |
| 112 | SiO2 | 104.69 |
| 113 | Ta2O5 | 51.54 |
| 114 | SiO2 | 94.19 |
| 115 | Ta2O5 | 80.48 |
| 116 | SiO2 | 116.45 |
| 117 | Ta2O5 | 74.03 |
| 118 | SiO2 | 99.47 |
| 119 | Ta2O5 | 68.36 |
| 120 | SiO2 | 92.73 |
| 121 | Ta2O5 | 64.97 |
| 122 | SiO2 | 101.15 |
| 123 | Ta2O5 | 70.04 |
| 124 | SiO2 | 101.49 |

-continued

| # | Mat | Thickness (nm) |
|---|---|---|
| 125 | Ta2O5 | 75.98 |
| 126 | SiO2 | 101.4 |
| 127 | Ta2O5 | 54.91 |
| 128 | SiO2 | 88.17 |
| 129 | Ta2O5 | 59.39 |
| 130 | SiO2 | 91.68 |
| 131 | Ta2O5 | 61.09 |
| 132 | SiO2 | 93.59 |
| 133 | Ta2O5 | 53.97 |
| 134 | SiO2 | 92.41 |
| 135 | Ta2O5 | 56.98 |
| 136 | SiO2 | 82.29 |
| 137 | Ta2O5 | 48.42 |
| 138 | SiO2 | 84.47 |
| 139 | Ta2O5 | 53.96 |
| 140 | SiO2 | 86.05 |
| 141 | Ta2O5 | 58.02 |
| 142 | SiO2 | 94.11 |
| 143 | Ta2O5 | 70.05 |
| 144 | SiO2 | 83.02 |
| 145 | Ta2O5 | 52.96 |
| 146 | SiO2 | 83.15 |
| 147 | Ta2O5 | 49.89 |
| 148 | SiO2 | 75.3 |
| 149 | Ta2O5 | 48.62 |
| 150 | SiO2 | 83.8 |
| 151 | Ta2O5 | 49.02 |
| 152 | SiO2 | 68.66 |
| 153 | Ta2O5 | 39.66 |
| 154 | SiO2 | 75.58 |
| 155 | Ta2O5 | 44.85 |
| 156 | SiO2 | 74.56 |
| 157 | Ta2O5 | 49.28 |
| 158 | SiO2 | 79.59 |
| 159 | Ta2O5 | 50.59 |
| 160 | SiO2 | 71.85 |
| 161 | Ta2O5 | 40.02 |
| 162 | SiO2 | 67.6 |
| 163 | Ta2O5 | 43.03 |
| 164 | SiO2 | 76.47 |
| 165 | Ta2O5 | 56.84 |
| 166 | SiO2 | 72.24 |
| 167 | Ta2O5 | 45.08 |
| 168 | SiO2 | 83.95 |
| 169 | Ta2O5 | 48.72 |

Figure 3:
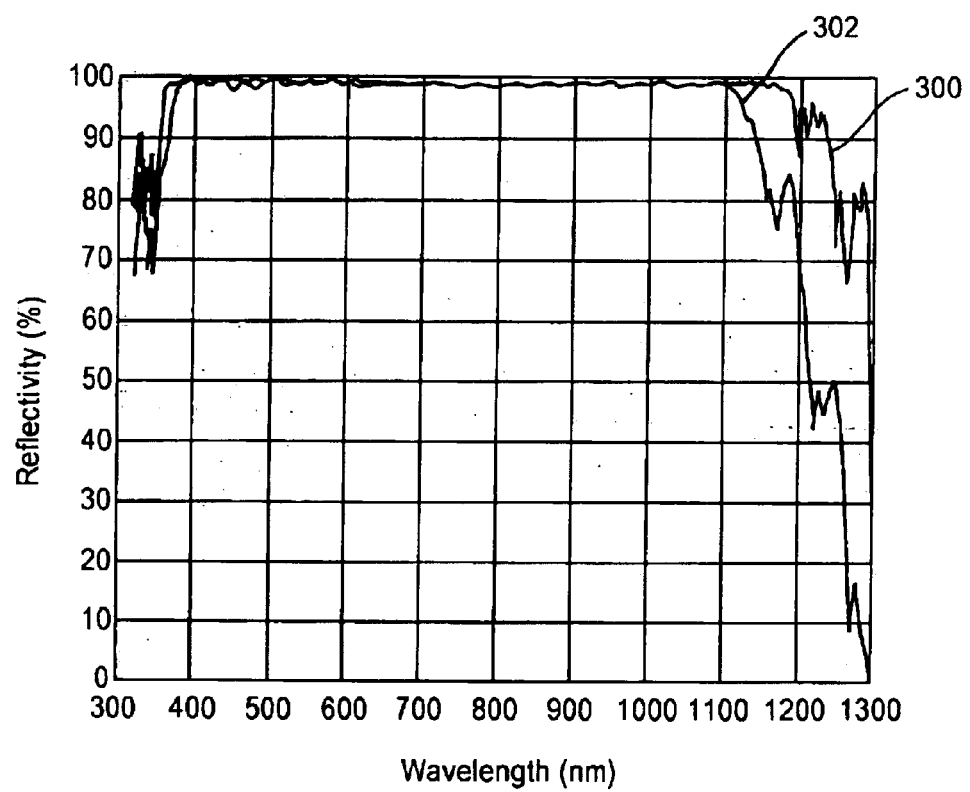
FIG. 3: illustrates a measured reflectivity v. wavelength spectrum for exemplary mirror consistent with the invention.

FIG. 3 illustrates measured reflectance vs. wavelength at an AOI of 45 degrees associated with the filter having the layer structure described in Table 1. Plot 300 illustrates measured reflectance vs. wavelength for the s-polarization, and plot 302 illustrates measured reflectance vs. wavelength for the p-polarization. As shown, the exemplary mirror exhibits a reflectivity for a 45 degree AOI of greater than about 98.5% for both s and p-polarizations over a wavelength range of about 390 to 1100 nm. This high reflectivity over a broad bandwidth has significant advantages over the prior art, as discussed above. For example, a tunable or multi-line laser system including a mirror consistent with the invention may be used over its entire tunable or multi-line bandwidth.

Advantageously, a mirror consistent with the invention may be configured to provide high reflectivity, i.e. greater than about 97.5% and typically greater than 99%, for both s and p-polarizations over a broad range of wavelengths and for a wide variation in AOI. For example, table 2 below illustrates the specific layer structure for an exemplary embodiment of a reflector portion 102 of mirror consistent with the invention including 193 alternating hard coating layers of tantalum pentoxide ($Ta_2O_5$, index of about 2.1) and silicon dioxide ($SiO_2$, index of about 1.5) deposited on a BK7 substrate. Again, the identified layers were deposited using a timing technique and an ion-assisted, ion-beam sputtering vacuum system.

TABLE 2

| # | Mat | Thickness (nm) |
|---|---|---|
| 1 | Ta2O5 | 152.03 |
| 2 | SiO2 | 237.56 |
| 3 | Ta2O5 | 161.55 |
| 4 | SiO2 | 234.26 |
| 5 | Ta2O5 | 151.75 |
| 6 | SiO2 | 230.84 |
| 7 | Ta2O5 | 142.42 |
| 8 | SiO2 | 227.43 |
| 9 | Ta2O5 | 142.26 |
| 10 | SiO2 | 224.44 |
| 11 | Ta2O5 | 140.52 |
| 12 | SiO2 | 221.26 |
| 13 | Ta2O5 | 141.79 |
| 14 | SiO2 | 218.18 |
| 15 | Ta2O5 | 134.09 |
| 16 | SiO2 | 215.09 |
| 17 | Ta2O5 | 140.31 |
| 18 | SiO2 | 212.23 |
| 19 | Ta2O5 | 135.22 |
| 20 | SiO2 | 209.27 |
| 21 | Ta2O5 | 134.17 |
| 22 | SiO2 | 206.26 |
| 23 | Ta2O5 | 127.96 |
| 24 | SiO2 | 203.44 |
| 25 | Ta2O5 | 128.16 |
| 26 | SiO2 | 200.53 |
| 27 | Ta2O5 | 125.86 |
| 28 | SiO2 | 197.99 |
| 29 | Ta2O5 | 134.58 |
| 30 | SiO2 | 195.13 |
| 31 | Ta2O5 | 123.97 |
| 32 | SiO2 | 192.48 |
| 33 | Ta2O5 | 128.12 |
| 34 | SiO2 | 189.73 |
| 35 | Ta2O5 | 116.35 |
| 36 | SiO2 | 186.88 |
| 37 | Ta2O5 | 118.01 |
| 38 | SiO2 | 184.36 |
| 39 | Ta2O5 | 114.1 |
| 40 | SiO2 | 181.91 |
| 41 | Ta2O5 | 120.57 |
| 42 | SiO2 | 179.5 |
| 43 | Ta2O5 | 116.77 |
| 44 | SiO2 | 177.05 |
| 45 | Ta2O5 | 122.67 |
| 46 | SiO2 | 174.62 |
| 47 | Ta2O5 | 112.93 |
| 48 | SiO2 | 171.99 |
| 49 | Ta2O5 | 110.35 |
| 50 | SiO2 | 169.61 |
| 51 | Ta2O5 | 104.77 |
| 52 | SiO2 | 167.25 |
| 53 | Ta2O5 | 109.5 |
| 54 | SiO2 | 165.02 |
| 55 | Ta2O5 | 112.87 |
| 56 | SiO2 | 162.73 |
| 57 | Ta2O5 | 107.75 |
| 58 | SiO2 | 160.42 |
| 59 | Ta2O5 | 104.95 |
| 60 | SiO2 | 158.12 |
| 61 | Ta2O5 | 100.99 |
| 62 | SiO2 | 155.95 |
| 63 | Ta2O5 | 101.88 |
| 64 | SiO2 | 153.85 |
| 65 | Ta2O5 | 99.06 |
| 66 | SiO2 | 151.57 |
| 67 | Ta2O5 | 99.35 |
| 68 | SiO2 | 149.66 |
| 69 | Ta2O5 | 102.7 |
| 70 | SiO2 | 147.5 |
| 71 | Ta2O5 | 94.56 |
| 72 | SiO2 | 145.38 |

TABLE 2-continued

| # | Mat | Thickness (nm) |
|---|---|---|
| 73 | Ta2O5 | 93.65 |
| 74 | SiO2 | 143.35 |
| 75 | Ta2O5 | 97.25 |
| 76 | SiO2 | 141.49 |
| 77 | Ta2O5 | 95.67 |
| 78 | SiO2 | 139.4 |
| 79 | Ta2O5 | 87.81 |
| 80 | SiO2 | 137.37 |
| 81 | Ta2O5 | 89.67 |
| 82 | SiO2 | 135.59 |
| 83 | Ta2O5 | 89.43 |
| 84 | SiO2 | 133.71 |
| 85 | Ta2O5 | 89.63 |
| 86 | SiO2 | 131.81 |
| 87 | Ta2O5 | 81.64 |
| 88 | SiO2 | 129.83 |
| 89 | Ta2O5 | 84.23 |
| 90 | SiO2 | 128.25 |
| 91 | Ta2O5 | 90.14 |
| 92 | SiO2 | 126.52 |
| 93 | Ta2O5 | 82.96 |
| 94 | SiO2 | 124.54 |
| 95 | Ta2O5 | 75.17 |
| 96 | SiO2 | 122.85 |
| 97 | Ta2O5 | 79.93 |
| 98 | SiO2 | 121.23 |
| 99 | Ta2O5 | 84.23 |
| 100 | SiO2 | 119.54 |
| 101 | Ta2O5 | 80.13 |
| 102 | SiO2 | 117.84 |
| 103 | Ta2O5 | 75.27 |
| 104 | SiO2 | 116.25 |
| 105 | Ta2O5 | 80.76 |
| 106 | SiO2 | 114.53 |
| 107 | Ta2O5 | 67.57 |
| 108 | SiO2 | 112.87 |
| 109 | Ta2O5 | 73.12 |
| 110 | SiO2 | 111.45 |
| 111 | Ta2O5 | 72.73 |
| 112 | SiO2 | 109.8 |
| 113 | Ta2O5 | 70.17 |
| 114 | SiO2 | 108.4 |
| 115 | Ta2O5 | 74.25 |
| 116 | SiO2 | 106.81 |
| 117 | Ta2O5 | 66.72 |
| 118 | SiO2 | 105.27 |
| 119 | Ta2O5 | 69.34 |
| 120 | SiO2 | 103.94 |
| 121 | Ta2O5 | 70.7 |
| 122 | SiO2 | 102.41 |
| 123 | Ta2O5 | 65.97 |
| 124 | SiO2 | 101.04 |
| 125 | Ta2O5 | 68.37 |
| 126 | SiO2 | 99.59 |
| 127 | Ta2O5 | 65.07 |
| 128 | SiO2 | 98.25 |
| 129 | Ta2O5 | 62.43 |
| 130 | SiO2 | 96.72 |
| 131 | Ta2O5 | 60.83 |
| 132 | SiO2 | 95.53 |
| 133 | Ta2O5 | 58.79 |
| 134 | SiO2 | 93.99 |
| 135 | Ta2O5 | 57.42 |
| 136 | SiO2 | 92.86 |
| 137 | Ta2O5 | 55.9 |
| 138 | SiO2 | 91.44 |
| 139 | Ta2O5 | 60.88 |
| 140 | SiO2 | 90.33 |
| 141 | Ta2O5 | 56.35 |
| 142 | SiO2 | 88.95 |
| 143 | Ta2O5 | 54.85 |
| 144 | SiO2 | 87.71 |
| 145 | Ta2O5 | 56.18 |
| 146 | SiO2 | 86.67 |
| 147 | Ta2O5 | 60.87 |
| 148 | SiO2 | 85.35 |
| 149 | Ta2O5 | 56.23 |
| 150 | SiO2 | 84.2 |
| 151 | Ta2O5 | 54.62 |
| 152 | SiO2 | 82.98 |
| 153 | Ta2O5 | 49.34 |
| 154 | SiO2 | 81.66 |
| 155 | Ta2O5 | 44.84 |
| 156 | SiO2 | 80.62 |
| 157 | Ta2O5 | 48.88 |
| 158 | SiO2 | 79.54 |
| 159 | Ta2O5 | 49.96 |
| 160 | SiO2 | 78.44 |
| 161 | Ta2O5 | 48.94 |
| 162 | SiO2 | 77.32 |
| 163 | Ta2O5 | 47.19 |
| 164 | SiO2 | 76.32 |
| 165 | Ta2O5 | 50.05 |
| 166 | SiO2 | 75.17 |
| 167 | Ta2O5 | 47.89 |
| 168 | SiO2 | 74.25 |
| 169 | Ta2O5 | 47.31 |
| 170 | SiO2 | 73.14 |
| 171 | Ta2O5 | 48.23 |
| 172 | SiO2 | 72.12 |
| 173 | Ta2O5 | 48.17 |
| 174 | SiO2 | 71.22 |
| 175 | Ta2O5 | 46.39 |
| 176 | SiO2 | 70.15 |
| 177 | Ta2O5 | 51.31 |
| 178 | SiO2 | 69.3 |
| 179 | Ta2O5 | 48.88 |
| 180 | SiO2 | 68.18 |
| 181 | Ta2O5 | 42.68 |
| 182 | SiO2 | 67.4 |
| 183 | Ta2O5 | 51.6 |
| 184 | SiO2 | 66.35 |
| 185 | Ta2O5 | 49.56 |
| 186 | SiO2 | 65.51 |
| 187 | Ta2O5 | 42.82 |
| 188 | SiO2 | 64.74 |
| 189 | Ta2O5 | 48.16 |
| 190 | SiO2 | 63.27 |
| 191 | Ta2O5 | 49.6 |
| 192 | SiO2 | 63.21 |
| 193 | Ta2O5 | 27.65 |

Figure 4:
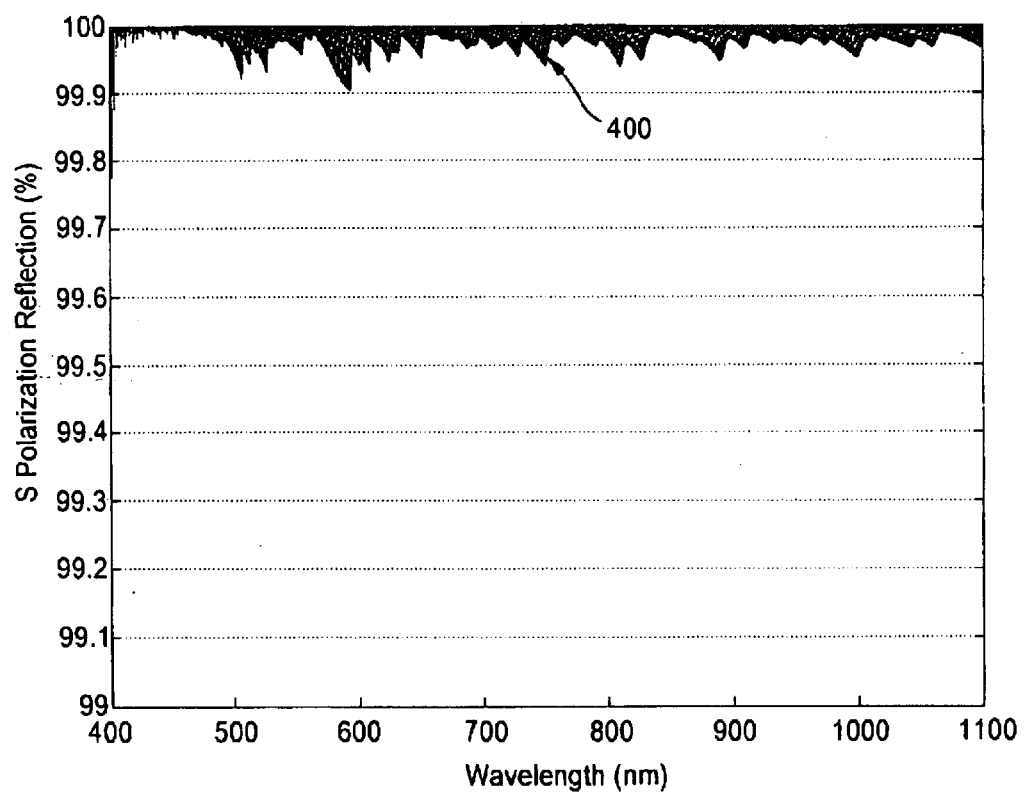
FIG. 4: illustrates superimposed plots of calculated s-polarization reflectivity v. wavelength for angles of incidence between 0 and 50 degrees taken in 0.5 degree steps for an exemplary mirror consistent with the invention.
Figure 5:
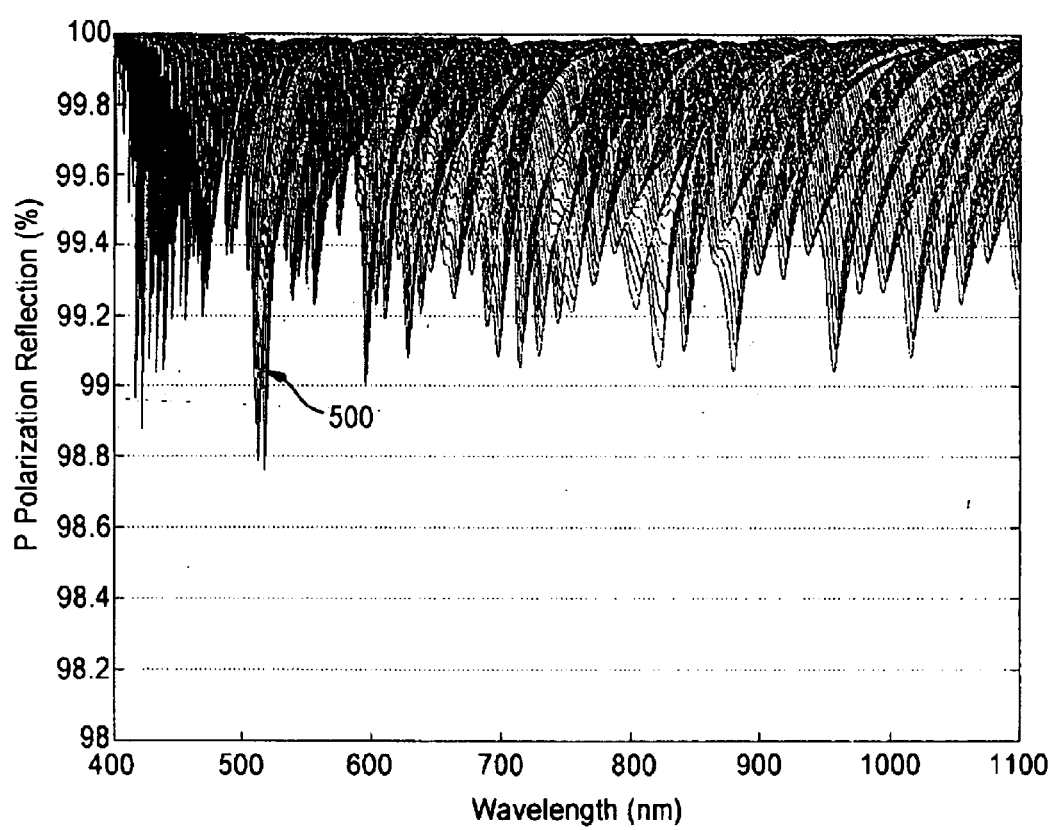
FIG. 5: illustrates superimposed plots of calculated p-polarization reflectivity v. wavelength for angles of incidence between 0 and 50 degrees taken in 0.5 degree steps for an exemplary mirror consistent with the invention.

FIGS. 4 and 5 illustrate the wide angle performance of a mirror consistent with the invention and constructed in accordance with Table 2. FIG. 4 illustrates superimposed theoretical plots 400 of reflectance vs. wavelength for the s-polarization for an AOI of 0 to 50 degrees in 0.5 degree steps. As shown, the s-polarization reflectivity stays above about 99.77% in the range from 400 nm to 1100 nm. FIG. 5 illustrates superimposed theoretical plots 500 of reflectance vs. wavelength for the p-polarization for an AOI of 0 to 50 degrees in 0.5 degree steps. Those skilled in the art will recognize that conventional dielectric mirrors exhibit relatively poor reflectivity for p-polarized light at large AOI. As shown, however, in a mirror consistent with the present invention the p-polarization reflectivity stays above about 98.75% for a range of AOI from 0 to 50 degrees over a broad wavelength range from 400 nm to 1100 nm.

Figure 6:
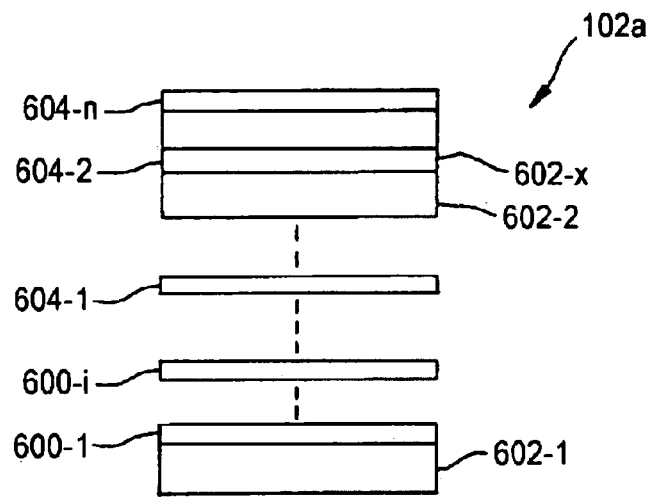
FIG. 6: is a schematic illustration of alternating layers of high and low index of refraction material for another exemplary embodiment of a reflector portion for the mirror illustrated in FIG. 1.

In another exemplary embodiment of a mirror consistent with the invention, the high reflectivity bandwidth may be expanded in the low wavelengths to about 350 nm through use of two distinct high index of refraction materials. With reference to FIG. 6, for example, a reflector portion 102a may be formed by hard coating layers 602-1, 602-2 ... 602-x of low index of refraction material alternated with hard coating layers 600-1 ... 600-i of a first high index of refraction material adjacent the substrate, and then with layers 604-1, 604-2 . . . 604-*n* of a second high index of refraction material adjacent the top surface of the reflector layer.

In one embodiment, for example, alternating layers of $SiO_2$ and $Nb_2O_5$ may be deposited adjacent the substrate, with alternating layers of $SiO_2$ and $Ta_2O_5$ deposited adjacent the top surface of the reflector portion. In general, the $Nb_2O_5$ layers facilitate high reflectivity of longer wavelengths, but absorb shorter wavelengths. The $Ta_2O_5$ layers adjacent the top surface of the reflector portion exhibit less absorption of the shorter wavelengths than $Nb_2O_5$, thereby permitting high reflectivity of the shorter wavelengths. An advantage of using $Nb_2O_5$ for the layers that correspond to reflection of the longer wavelengths is that the higher index of this material relative to $Ta_2O_5$ enables the overall thickness of the coating to be kept to a minimum.

Table 3 below illustrates the specific layer structure for an exemplary embodiment of a reflector portion 102*a* of mirror consistent with the invention including first and second high index of refraction materials and a single low index of refraction material. The mirror in the Table 3 includes 172 alternating hard coating layers of alternating high and low index of refraction material deposited on a BK7 substrate. Layers 1–130 are alternating layers of niobia, $Nb_2O_5$, and $SiO_2$, and layers 131–172 are alternating layers of $Ta_2O_5$ and $SiO_2$. Again, the identified layers were deposited using a timing technique and an ion-assisted, ion-beam sputtering vacuum system.

TABLE 3

| # | Mat | Thickness (nm) |
|---|---|---|
| 1 | Nb2O5 | 140.85 |
| 2 | SiO2 | 241.94 |
| 3 | Nb2O5 | 152.20 |
| 4 | SiO2 | 232.07 |
| 5 | Nb2O5 | 144.59 |
| 6 | SiO2 | 207.29 |
| 7 | Nb2O5 | 123.11 |
| 8 | SiO2 | 209.07 |
| 9 | Nb2O5 | 128.43 |
| 10 | SiO2 | 208.04 |
| 11 | Nb2O5 | 121.35 |
| 12 | SiO2 | 207.09 |
| 13 | Nb2O5 | 133.06 |
| 14 | SiO2 | 226.08 |
| 15 | Nb2O5 | 125.64 |
| 16 | SiO2 | 196.31 |
| 17 | Nb2O5 | 119.60 |
| 18 | SiO2 | 213.37 |
| 19 | Nb2O5 | 125.09 |
| 20 | SiO2 | 195.46 |
| 21 | Nb2O5 | 123.00 |
| 22 | SiO2 | 195.24 |
| 23 | Nb2O5 | 127.14 |
| 24 | SiO2 | 198.78 |
| 25 | Nb2O5 | 104.69 |
| 26 | SiO2 | 196.09 |
| 27 | Nb2O5 | 117.87 |
| 28 | SiO2 | 181.94 |
| 29 | Nb2O5 | 107.42 |
| 30 | SiO2 | 171.41 |
| 31 | Nb2O5 | 104.06 |
| 32 | SiO2 | 162.13 |
| 33 | Nb2O5 | 97.00 |
| 34 | SiO2 | 180.07 |
| 35 | Nb2O5 | 108.55 |
| 36 | SiO2 | 174.46 |
| 37 | Nb2O5 | 107.74 |
| 38 | SiO2 | 171.50 |
| 39 | Nb2O5 | 103.88 |
| 40 | SiO2 | 160.37 |
| 41 | Nb2O5 | 105.57 |
| 42 | SiO2 | 171.74 |
| 43 | Nb2O5 | 94.36 |
| 44 | SiO2 | 147.96 |
| 45 | Nb2O5 | 102.64 |
| 46 | SiO2 | 176.88 |
| 47 | Nb2O5 | 87.08 |
| 48 | SiO2 | 139.79 |
| 49 | Nb2O5 | 89.86 |
| 50 | SiO2 | 142.18 |
| 51 | Nb2O5 | 93.77 |
| 52 | SiO2 | 143.52 |
| 53 | Nb2O5 | 85.27 |
| 54 | SiO2 | 145.55 |
| 55 | Nb2O5 | 91.07 |
| 56 | SiO2 | 139.84 |
| 57 | Nb2O5 | 82.74 |
| 58 | SiO2 | 147.64 |
| 59 | Nb2O5 | 80.15 |
| 60 | SiO2 | 139.16 |
| 61 | Nb2O5 | 75.05 |
| 62 | SiO2 | 134.49 |
| 63 | Nb2O5 | 88.47 |
| 64 | SiO2 | 150.80 |
| 65 | Nb2O5 | 79.30 |
| 66 | SiO2 | 132.66 |
| 67 | Nb2O5 | 72.36 |
| 68 | SiO2 | 118.99 |
| 69 | Nb2O5 | 67.41 |
| 70 | SiO2 | 117.20 |
| 71 | Nb2O5 | 75.53 |
| 72 | SiO2 | 130.93 |
| 73 | Nb2O5 | 70.62 |
| 74 | SiO2 | 115.24 |
| 75 | Nb2O5 | 66.79 |
| 76 | SiO2 | 118.04 |
| 77 | Nb2O5 | 76.07 |
| 78 | SiO2 | 127.94 |
| 79 | Nb2O5 | 67.62 |
| 80 | SiO2 | 100.85 |
| 81 | Nb2O5 | 59.87 |
| 82 | SiO2 | 116.78 |
| 83 | Nb2O5 | 68.46 |
| 84 | SiO2 | 115.42 |
| 85 | Nb2O5 | 69.96 |
| 86 | SiO2 | 111.95 |
| 87 | Nb2O5 | 58.65 |
| 88 | SiO2 | 98.24 |
| 89 | Nb2O5 | 61.82 |
| 90 | SiO2 | 100.67 |
| 91 | Nb2O5 | 49.31 |
| 92 | SiO2 | 101.85 |
| 93 | Nb2O5 | 60.12 |
| 94 | SiO2 | 97.87 |
| 95 | Nb2O5 | 51.90 |
| 96 | SiO2 | 95.41 |
| 97 | Nb2O5 | 56.43 |
| 98 | SiO2 | 92.44 |
| 99 | Nb2O5 | 54.55 |
| 100 | SiO2 | 99.41 |
| 101 | Nb2O5 | 55.16 |
| 102 | SiO2 | 92.72 |
| 103 | Nb2O5 | 52.88 |
| 104 | SiO2 | 92.47 |
| 105 | Nb2O5 | 45.48 |
| 106 | SiO2 | 86.22 |
| 107 | Nb2O5 | 52.01 |
| 108 | SiO2 | 80.16 |
| 109 | Nb2O5 | 41.77 |
| 110 | SiO2 | 85.96 |
| 111 | Nb2O5 | 52.83 |
| 112 | SiO2 | 83.71 |
| 113 | Nb2O5 | 44.83 |
| 114 | SiO2 | 68.72 |
| 115 | Nb2O5 | 52.23 |

TABLE 3-continued

| # | Mat | Thickness (nm) |
|---|---|---|
| 116 | SiO2 | 89.75 |
| 117 | Nb2O5 | 43.35 |
| 118 | SiO2 | 55.47 |
| 119 | Nb2O5 | 46.60 |
| 120 | SiO2 | 79.53 |
| 121 | Nb2O5 | 51.97 |
| 122 | SiO2 | 82.83 |
| 123 | Nb2O5 | 43.86 |
| 124 | SiO2 | 72.95 |
| 125 | Nb2O5 | 39.60 |
| 126 | SiO2 | 60.07 |
| 127 | Nb2O5 | 51.86 |
| 128 | SiO2 | 81.43 |
| 129 | Nb2O5 | 39.64 |
| 130 | SiO2 | 115.12 |
| 131 | Ta2O5 | 28.54 |
| 132 | SiO2 | 84.35 |
| 133 | Ta2O5 | 44.32 |
| 134 | SiO2 | 78.78 |
| 135 | Ta2O5 | 39.96 |
| 136 | SiO2 | 81.06 |
| 137 | Ta2O5 | 46.49 |
| 138 | SiO2 | 75.15 |
| 139 | Ta2O5 | 40.80 |
| 140 | SiO2 | 78.86 |
| 141 | Ta2O5 | 32.56 |
| 142 | SiO2 | 74.72 |
| 143 | Ta2O5 | 35.83 |
| 144 | SiO2 | 73.75 |
| 145 | Ta2O5 | 36.46 |
| 146 | SiO2 | 73.95 |
| 147 | Ta2O5 | 38.70 |
| 148 | SiO2 | 71.27 |
| 149 | Ta2O5 | 39.92 |
| 150 | SiO2 | 70.64 |
| 151 | Ta2O5 | 39.72 |
| 152 | SiO2 | 69.17 |
| 153 | Ta2O5 | 36.54 |
| 154 | SiO2 | 69.71 |
| 155 | Ta2O5 | 40.35 |
| 156 | SiO2 | 66.07 |
| 157 | Ta2O5 | 48.06 |
| 158 | SiO2 | 67.02 |
| 159 | Ta2O5 | 39.30 |
| 160 | SiO2 | 65.29 |
| 161 | Ta2O5 | 34.65 |
| 162 | SiO2 | 64.99 |
| 163 | Ta2O5 | 40.45 |
| 164 | SiO2 | 61.04 |
| 165 | Ta2O5 | 43.05 |
| 166 | SiO2 | 63.77 |
| 167 | Ta2O5 | 40.39 |
| 168 | SiO2 | 62.94 |
| 169 | Ta2O5 | 47.24 |
| 170 | SiO2 | 57.44 |
| 171 | Ta2O5 | 32.50 |
| 172 | SiO2 | 134.56 |

Figure 7:
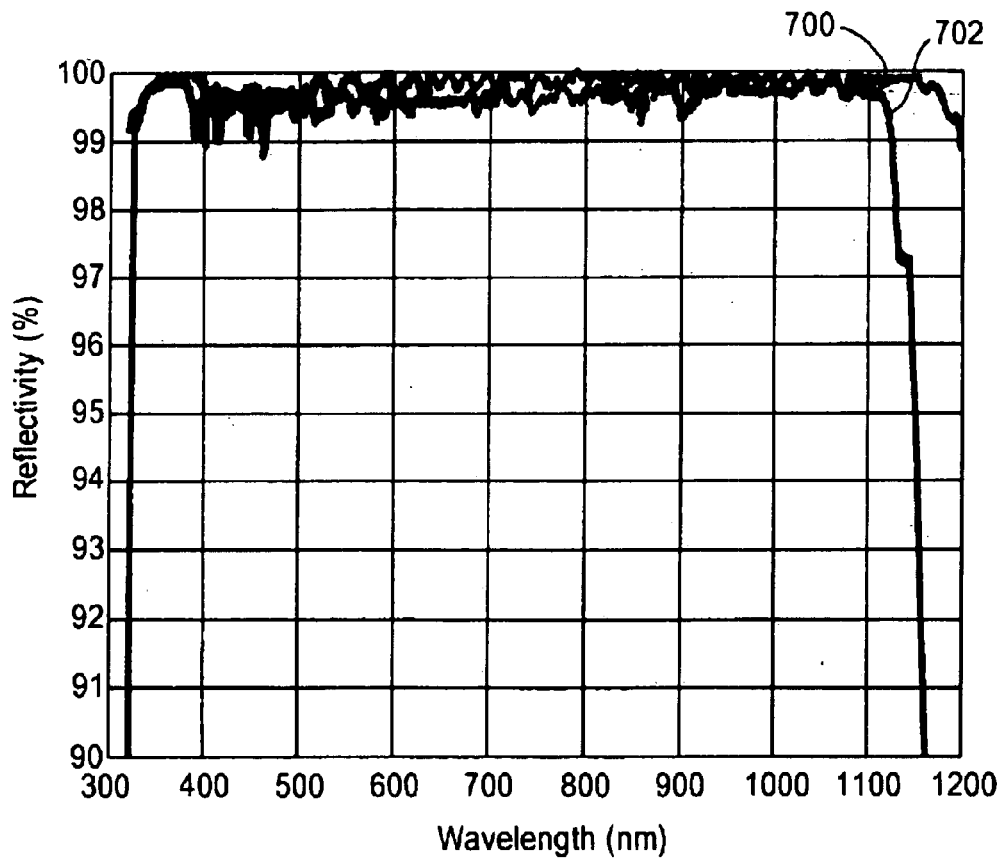
FIG. 7: illustrates a measured reflectivity v. wavelength spectrum for an exemplary mirror consistent with the invention including two high index of refraction materials and one low index of refraction material in a reflector portion.

FIG. 7 illustrates measured reflectance vs. wavelength at an AOI of 45 degrees associated with the filter having the layer structure described in Table 2. Plot 700 illustrates reflectance vs. wavelength for the s-polarization, and plot 702 illustrates reflectance vs. wavelength for the p-polarization. As shown, the exemplary mirror exhibits a reflectivity for a 45 degree AOI of greater than about 98.5% for both s and p-polarizations over the wavelength range extending from 340 to 1100 nm. Thus, use of two high index of refraction materials in the exemplary embodiment described in Table 3 has the advantageous effect of expanding the high reflectivity bandwidth by about 50 nm at the short wavelength end of the range, i.e. the short wavelength end of the high reflectivity range is expanded from 390 nm down to about 340 nm. In general, light at short wavelengths does not reach the niobia layers adjacent the substrate, and thus the niobia absorption doe not reduce the reflectivity of the short wavelengths. This provides a significant advantage in connection with, for example, Nd: YAG lasers, which have fundamental and popular harmonic wavelengths of 1064 nm, 532 nm, and 355 nm.

Figure 8:
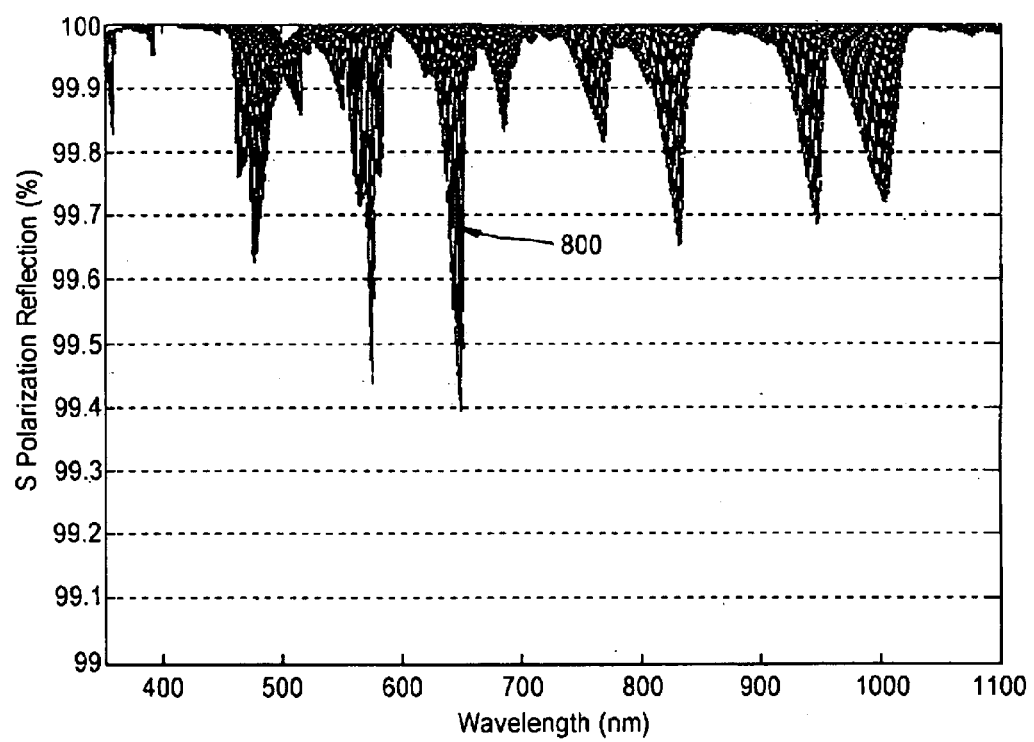
FIG. 8: illustrates superimposed plots of calculated s-polarization reflectivity v. wavelength for angles of incidence between 0 and 50 degrees taken in 0.5 degree steps for an exemplary mirror consistent with the invention.
Figure 9:
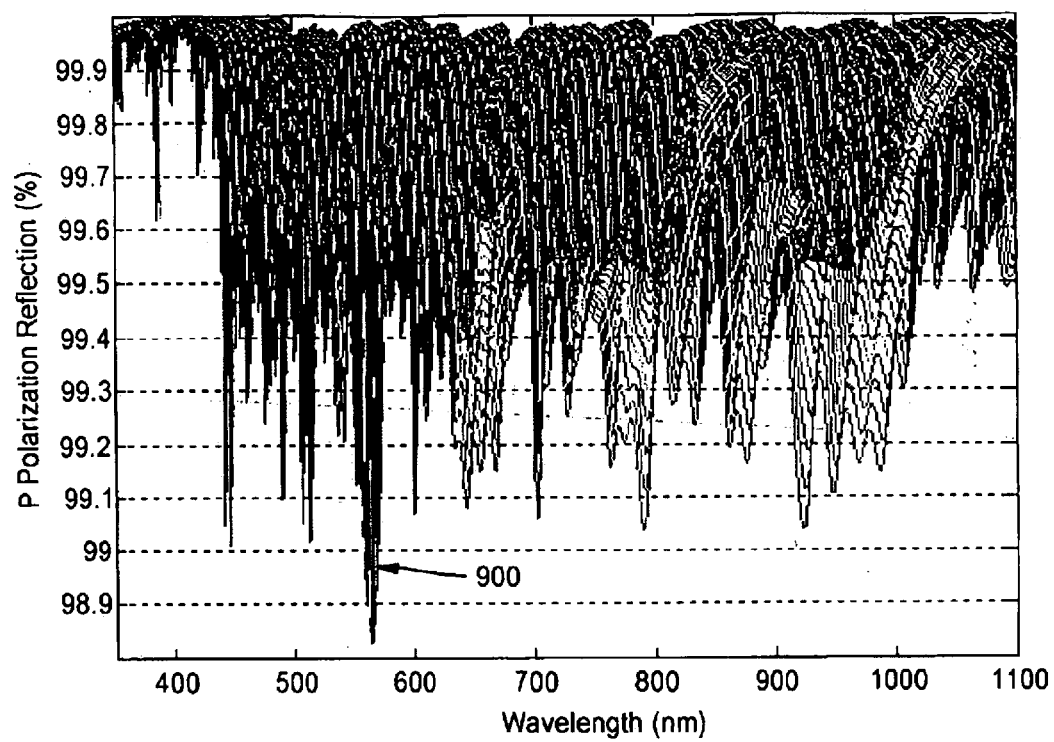
FIG. 9: illustrates superimposed plots of calculated p-polarization reflectivity v. wavelength for angles of incidence between 0 and 50 degrees taken in 0.5 degree steps for an exemplary mirror consistent with the invention.

Advantageously, a mirror consistent with the invention provides high reflectivity, i.e. greater than about 97.5% and typically greater than 99%, for a broad range of wavelengths for a wide variation in AOI. FIGS. 8 and 9 illustrate the wide angle performance of a mirror consistent with the invention and constructed in accordance with Table 3. FIG. 8 illustrates superimposed theoretical plots 800 of reflectance vs. wavelength for the s-polarization for an AOI of 0 to 50 degrees in 0.5 degree steps. As shown, the s-polarization reflectivity stays above about 99.39% in the range from 350 nm to 1100 nm. FIG. 9 illustrates superimposed theoretical plots 900 of reflectance vs. wavelength for the p-polarization for an AOI of 0 to 50 degrees in 0.5 degree steps. As shown, the p-polarization reflectivity stays above about 98.8% in the range from 350 nm to 1100 nm.

Advantageously, using two high index of refraction materials with the high index of refraction material having the highest index of refraction, e.g. niobia, adjacent the substrate and the other high index of refraction material adjacent the mirror surface, allows high reflectivity over a broad wavelength and AOI range in a practical coating thickness. Keeping the coating thickness to a minimum allows the mirror to be deposited in less time than a mirror of greater thickness and yields a flatter mirror surface in a more reliable construction. Also, a high resistance to laser damage at shorter wavelengths is achieved because light at the shorter wavelengths reflects off the low-absorption high index material, e.g. tantala, near the mirror surface, and never reaches the high absorption material near the substrate.

A mirror consistent with the present invention also exhibits advantageous flatness and laser damage threshold (LDT) characteristics. Those skilled in the art will recognize that a thick reflector portion and dense films deposited using ion beam sputtering can result in competitive stresses. The competitive stresses may result from differences in the coefficients of thermal expansion of the coating materials relative to the substrate, and from the ion-assisted sputtering process itself, which densely packs the atoms in the coating layers thereby causing intrinsic stress. The competitive stresses can induce a bending moment in the substrate, which impacts the surface figure. For example, a mirror constructed from alternating silica and tantala layers on a 0.25" thick BK7 substrate having 1" diameter can exhibit approximately 1 wave of distortion at 633 nm. A typical requirement for a laser mirror, however, is that the mirror exhibit only $\frac{1}{10}$ wave of distortion.

With reference to FIG. 1, this impact on surface figure resulting from deposition of multiple dense layers can be overcome by depositing a compensating layer 108 on the side 110 of the substrate 104 opposite from the side 106 on which the reflector portion 102 is deposited. The compensating layer 108 is selected to exhibit higher stress than the substrate. In one embodiment, the compensating layer 108 may simply be a relatively thick layer of SiO2. Of course, this compensating layer 108 may not be necessary in applications where the surface figure is not critical.

Figure 10:
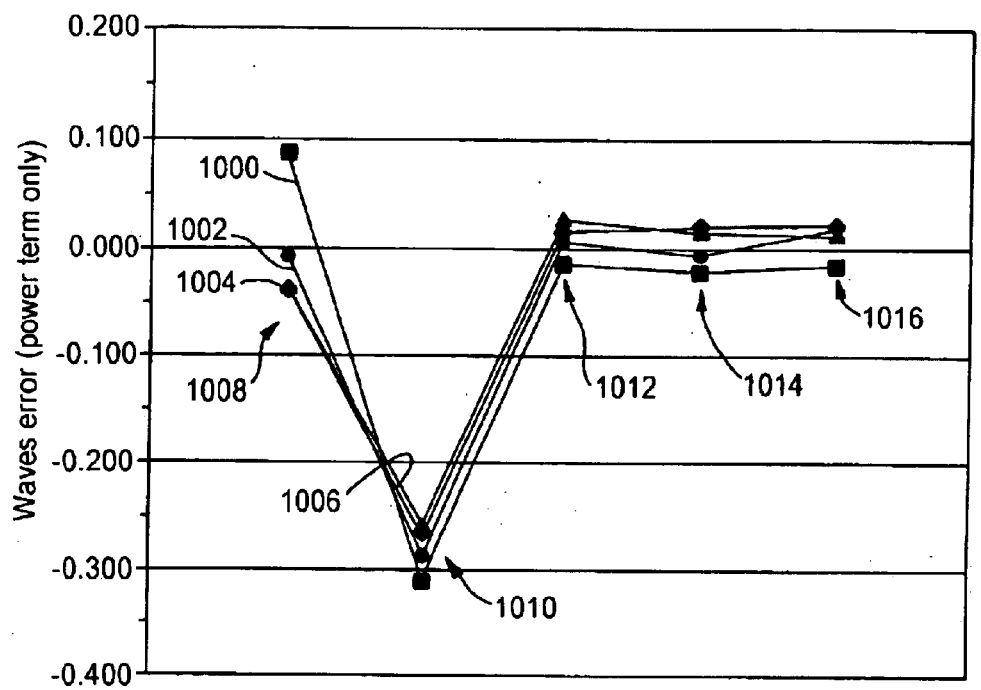
FIG. 10: is a plot of surface flatness wavelength error values related to four separate mirrors consistent with the invention.

FIG. 10 includes plots 1000, 1002, 1004, 1006 associated with each of four mirrors consistent with the invention illustrating the measured number of waves of error, or deviation from flatness, on a reflecting surface of the mirror, e.g. surface 112, with one wave equal to 633 nm. The plots are associated with mirrors consistent with the invention having a 1" diameter, a 3/8" thickness, and a $SiO_2$ stress compensation layer of 10.7±0.5 μm in thickness. Each plot includes data points associated with the substrate without the reflector coating thereon, generally at 1008, the substrate with the reflector coating thereon, generally at 1010, the substrate and reflector coating with a compensating layer 208, generally at 1012, the substrate and reflector coating with a compensating layer and after being annealed or baked at several hundred degrees C., generally at 1014, and the substrate and reflector coating with a compensating layer after being subjected to several days of damp heat, generally at 1016. Data points were obtained after annealing and subjecting the mirror to damp heat to demonstrate the effect of severe environmental conditions on mirror flatness.

As shown, the uncoated substrates were initially flat to better than $1/10^{th}$ of a wave, but then became curved with almost 3/10ths of a wave of curvature after the mirror coating was deposited. The compensation coating (the data points at 1012) then brought the flatness of a reflecting surface of the mirror back to well under $1/10^{th}$ of a wave for each of the four samples. In fact, the samples exhibited flatness to under $1/20^{th}$ of a wave, as shown. Also, severe environmental stress simulated by annealing and subjecting the samples to damp heat did not substantially affect flatness, i.e. flatness remained less than $1/10^{th}$ of a wave for each sample.

Figure 11:
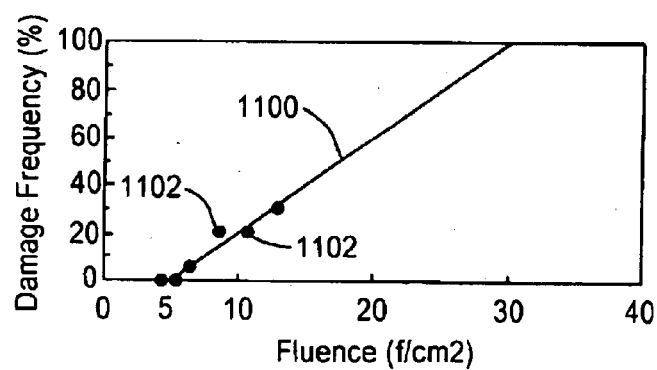
FIG. 11: is a plot of damage frequency vs. laser fluence illustrating the laser damage threshold for a mirror consistent with the invention.

A mirror consistent with the invention may also exhibit advantageous LDT characteristics. FIG. 11 is a plot 1000 illustrating LDT for a mirror consistent with the invention wherein the LDT was measured at 1064 nm using an ND:YAG laser. The laser was configured to produce pulses 20 nanoseconds long and at a 20 Hz repetition rate. The light was p-polarized and focused at a 45 degree angle of incidence to a spot size of 1.06 mm in diameter at the mirror in a $TEM_{00}$ Gaussian mode. At each site 200 pulses were shot, and the spot was then moved to a new site.

A range of different pulse fluences were used, with multiple sites for each fluence value. For each pulse fluence the number of damage sites (as observed under a microscope) was recorded. These numbers were expressed as a percentage of the total number of damage sites and plotted in FIG. 11 against the corresponding pulse fluence. The plot 1100 was established through the damage site values 1102, and an estimate of the LDT may be taken as the intercept of this line with the horizontal axis. In the illustrated example, the LDT is estimated to be 5 Joules/cm². Those skilled in the art will recognize that this LDT value represents advantageous LDT performance. LDT was also measured in an analogous manner at 490 nm using a pulsed dye laser and at 351 nm using a XeF excimer laser. LDT was estimated to be 2 Joules/cm² at 490 nm and 1.5 Joules/cm² at 351 nm. An LDT of greater than 1.5 Joules/cm² is exhibited over the range from about 351 nm to 1064 nm.

There is thus provided mirror that provides high reflectivity, for both s and p-polarized light, over a broad range of wavelengths for a wide range of angle of incidence. High reflectivity is achieved as a result of all-dielectric reflection and very low scattering. In addition, a mirror consistent with the present invention may be configured to exhibit advantageous LDT and flatness characteristics. In one embodiment, reflectivity greater than about 98% is achieved over the range of wavelengths extending from about 340 nm to 1100 nm. This reflectivity is achieved for AOI of between 0 and 50 degrees. This provides significant cost, efficiency, and convenience advantages over the prior art by allowing use of a single mirror with a range of laser wavelengths, e.g. for different lasers or over the tunable range of wavelengths for a particular laser.

The embodiments which have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A mirror comprising:
a substrate; and
a reflector portion disposed directly on a surface of said substrate, said reflector portion comprising alternating layers of high and low index of refraction material, said layers being configured for reflecting greater than 99% of all wavelengths in a bandwidth of greater than 400 nm at greater than 97.5% reflectivity, where a totality of said bandwidth is between 350 nm 1100 nm.

2. A mirror according to claim 1, wherein said layers are configured for reflecting a p-polarization of each said wavelength in said bandwidth at greater than 97.5% reflectivity.

3. A mirror according to claim 2, wherein said layers are configured for reflecting said p-polarization of each said wavelength in said bandwidth at greater than 97.5% reflectivity for a plurality of angles of incidence for said each said wavelength.

4. A mirror according to claim 2, wherein said layers are configured for reflecting said p-polarization of said each wavelength in said bandwidth at greater than 97.5% reflectivity for each angle of incidence between 0 degrees and 50 degrees for each said wavelength in said bandwidth.

5. A mirror according to claim 2, wherein said layers are configured for reflecting said p-polarization of said each wavelength in said bandwidth at greater than 99% reflectivity for each angle of incidence between 0 degrees and 5 degrees for each said wavelength in said bandwidth.

6. A mirror according to claim 2, wherein said layers are configured for reflecting said p-polarization of said each wavelength in said bandwidth at greater than 99% reflectivity for each angle of incidence between 42.5 degrees and 47.5 degrees for each said wavelength in said bandwidth.

7. A mirror according to claim 2, wherein said layers are configured for reflecting an s-polarization of each wavelength in said bandwidth at greater than 97.5% reflectivity.

8. A mirror according to claim 7, wherein said layers are configured for reflecting both said s-polarization and said p-polarization of each said wavelength in said bandwidth at greater than 97.5% reflectivity for a plurality of angles of incidence for said each said wavelength.

9. A mirror according to claim 7, wherein said layers are configured for reflecting both said s-polarization and said p-polarization of said each wavelength in said bandwidth at greater than 97.5% reflectivity for each angle of incidence between 0 degrees and 50 degrees for each said wavelength in said bandwidth.

10. A mirror according to claim 1, wherein a reflecting surface of said reflector portion deviates from flatness by less than $1/10^{th}$ of a measurement wavelength of 632.8 nm.

11. A mirror according to claim 1, wherein a reflecting surface of said reflector portion deviates from flatness by less than $1/20^{th}$ of a measurement wavelength of 632.8 nm.

12. A mirror according to claim 1, wherein layers are configured to exhibit a laser damage threshold of greater than about 1.5 Joules/cm² for wavelengths within said bandwidth.

13. A mirror according to claim 1, wherein layers are configured to exhibit a laser damage threshold of greater than about 1.5 Joules/cm$^2$ for wavelengths from 351 nm to 1064 nm.

14. A mirror according to claim 1, wherein said bandwidth is greater than or equal to 700 nm.

15. A mirror according to claim 1, wherein said reflector portion comprises in excess of 150 of said layers.

16. A mirror according to claim 1, wherein said layers comprise exclusively dielectric material.

17. A mirror according to claim 16, wherein said layers comprise material selected from the group consisting of: $SiO_2$, $Ta_2O_5$, $Nb_2O_5$, $TiO_2$ and $HfO_2$.

18. A mirror according to claim 1, wherein said mirror comprises first and second ones of said high index of refraction material.

19. A mirror according to claim 18, wherein said first high index of refraction material alternates with said low index of refraction material adjacent said substrate and said second high index of refraction material alternates with said low index of refraction material adjacent a top surface of said reflector portion.

20. A mirror according to claim 18, wherein said first high index of refraction material comprises $Nb_2O_5$ and said second high index of refraction material comprises $Ta_2O_5$.

21. A mirror comprising:

a substrate;

a reflector portion disposed directly on a surface of said substrate, said reflector portion comprising alternating layers of high and low index of refraction material, said layers being configured for reflecting greater than 99% of all wavelengths in a bandwidth of grater than 400nm at greater than 97.5% reflectivity, said bandwidth including at least one wavelength in the range from 350 to 1100 nm; and a compensating layer disposed directly on a back surface of said substrate opposite to said surface on which said reflector portion is disposed, said compensating layer configured to counteract a stress-induced bending in said reflector portion.

22. A mirror according to claim 21, wherein said compensating layer comprises $SiO_2$.

23. A mirror according to claim 21, wherein a reflecting surface of said reflector portion deviates from flatness by less than $1/10^{th}$ of a measurement wavelength of 632.8 nm.

24. A mirror according to claim 21, wherein a reflecting surface of said reflector portion deviates from flatness by less than $1/20^{th}$ of a measurement wavelength of 632.8 nm.

25. A mirror comprising:

a substrate; and a reflector portion disposed directly on a surface of said substrate, said reflector portion comprising in excess of 150 alternating layers of high and low index of refraction dielectric material, a first one of said high index of refraction materials alternating with said low index of refraction material adjacent said substrate and a second one of said high index of refraction materials alternating with said low index of refraction material adjacent a top surface of said reflector portion, said layers being configured for reflecting an s-polarization and p-polarization of greater than 99% of all wavelengths in a bandwidth of greater than 400 nm at greater than 97.5% reflectivity, where a totality of said bandwidth is between 350 nm and 1100 nm.

26. A mirror according to claim 25, wherein said layers are configured for reflecting both s-polarization and p-polarization of said each said wavelength in said bandwidth at greater than 97.5% reflectivity for a plurality of angles of incidence for said each said wavelength.

27. A mirror according to claim 25, wherein said first high index of refraction material comprises $Nb_2O_5$ and said second high index of refraction material comprises $Ta_2O_5$.

28. A mirror comprising:

a substrate;

a reflector portion disposed directly on a surface of said substrate, said reflector portion comprising in excess of 150 alternating layers of high and low index of refraction dielectric material, a first one of said high index of refraction materials alternating with said low index of refraction material adjacent said substrate and a second one of said high index of refraction materials alternating with said low index of refraction material adjacent a top surface of said reflector portion, said layers being configured for reflecting an s-polarization and p-polarization of greater than 99% of all wavelengths in a bandwidth of greater than 400nm at greater than 97.5% reflectivity; and a compensating layer disposed directly on a back surface of said substrate opposite to said surface on which said reflector portion is disposed, said compensating layer configured to counteract a stress-induced bending in said reflector portion.

29. A mirror according to claim 28, wherein said compensating layer comprises SiO2.

30. A mirror according to claim 28, wherein a reflecting surface of said reflector portion deviates from flatness by less than $1/10^{th}$ of a measurement wavelength of 632.8 nm.

31. A mirror according to claim 28, wherein a reflecting surface of said reflector portion deviates from flatness by less than $1/20^{th}$ of a measurement wavelength of 632.8 nm.

32. A mirror comprising:

a substrate; and a reflector portion disposed directly on said substrate, said reflector portion comprising alternating layers of high and low index of refraction material, said layers being configured for reflecting greater than 99% of all wavelengths in the range from 400 nm to 1100 at greater than 98% reflectivity at a plurality of angles of incidence for each said wavelength.

* * * * *

UNITED STATES PATENT AND TRADEMARK OFFICE
CERTIFICATE OF CORRECTION

PATENT NO. : 6,894,838 B2
DATED : May 17, 2005
INVENTOR(S) : Mizrahi et al.

It is certified that error appears in the above-identified patent and that said Letters Patent is hereby corrected as shown below:

Title page,
Item [57], ABSTRACT,
Line 10, delete the number "100" and add the number -- 1100 --.

Column 17,
Line 32, delete the word "grater" and insert the word -- greater --.

Signed and Sealed this

Sixteenth Day of August, 2005

JON W. DUDAS
*Director of the United States Patent and Trademark Office*

(12) EX PARTE REEXAMINATION CERTIFICATE (8092nd)
United States Patent
Mizrahi et al.

(10) Number: US 6,894,838 C1
(45) Certificate Issued: Mar. 15, 2011

(54) EXTENDED BANDWIDTH MIRROR

(75) Inventors: Victor Mizrahi, Anapolis, MD (US); Ligang Wang, Rochester, NY (US)

(73) Assignee: Semrock, Inc., Rochester, NY (US)

Reexamination Request:
No. 90/010,878, Feb. 26, 2010

Reexamination Certificate for:
Patent No.: 6,894,838
Issued: May 17, 2005
Appl. No.: 10/426,228
Filed: Apr. 30, 2003

Certificate of Correction issued Aug. 16, 2005.

Related U.S. Application Data

(60) Provisional application No. 60/409,170, filed on Sep. 9, 2002.

(51) Int. Cl.
*G02B 5/08* (2006.01)

(52) U.S. Cl. .................. 359/584; 359/587; 359/589; 359/883

(58) Field of Classification Search .................. None
See application file for complete search history.

(56) References Cited

U.S. PATENT DOCUMENTS

| | | | |
|---|---|---|---|
| 4,229,066 A | 10/1980 | Rancourt et al. | |
| 4,293,732 A | 10/1981 | Rancourt et al. | |
| 4,310,783 A | 1/1982 | Temple et al. | |
| 4,578,527 A | 3/1986 | Rancourt et al. | |
| 4,663,557 A | 5/1987 | Martin, Jr. et al. | |
| 4,735,488 A | 4/1988 | Rancourt et al. | |
| 4,846,551 A | 7/1989 | Rancourt et al. | |

OTHER PUBLICATIONS

SH. A. Furman, et al., "Chapter 1 Spectral Characteristics of Multilayer Coatings: Theory," from *Basics of Optics of Multilayer Systems*, Edition Frontieres, Gif–Sur–Yvette (1992), pp. 1–103 (104 pages total).

E. Pelletier et al., "Synthese d'empilements de couches minces," Nouvelle Revue d'Optique appliquée, 1971, vol. 2, No. 5, pp. 247 254 (23 pages, including Translator Certification (1 page), and 14–page English–language translation).

J.C. Manifacier et al., "A simple method for the determination of the optical constants n, k and the thickness of a weakly absorbing thin film," *Journal of Physics E*, vol. 9, 1976, pp. 1002–1004 (3 pages).

H.A. MacLeod, *Thin–Film Optical Filters*, pp. 198–209 (Third Edition, Taylor & Fancis, NY, 2001) (12 pages).

H. A. MacLeod, Thin Film Optical Filters, 3rd Edition, MacMillan Publishing Co., NY (2001).

Philip W. Baumeister, Thin Film Technology Course book, Mar. 1998.

Thin Film Design Software for Windows, Version 3.5 (2002).

Konstantin V. Popov, Broadband high–reflection multilayer coatings at oblique angles of incidence, Apr. 1, 1997, vol. 36, No. 10, Applied Optics (1997).

www.thorlabs.com, web product specification (2000).

Fornier, High laser damage threshold HfO2/SiO2 mirrors manufactured by sputtering process, Proceedings of the SPIE, the International Society for Optical Engineering (1999).

O'Brien, Recent Advances in Thin Film Interference Filters for Telecommunications, Society of Vacuum Coaters 505/856–7188 255, 44th Annual Technical Conference Proceedings—Philadelphia, Apr. 21–26, 2001.

*Primary Examiner*—James Menefee

(57) ABSTRACT

A dielectric mirror including a substrate and a reflector portion disposed directly on the substrate. The reflector portion includes alternating layers, e.g. in excess of 150 alternating layers, of high and low index of refraction material. In one embodiment, the layers are configured for reflecting each wavelength in a bandwidth of 400 nm at greater than 97.5% reflectivity. In another embodiment, the layers are configured for reflecting an s-polarization and p-polarization of each wavelength in the range from 350 nm to 1100 nm at greater than 98% reflectivity. High reflectivity is achieved for a wide range of angle of incidence.

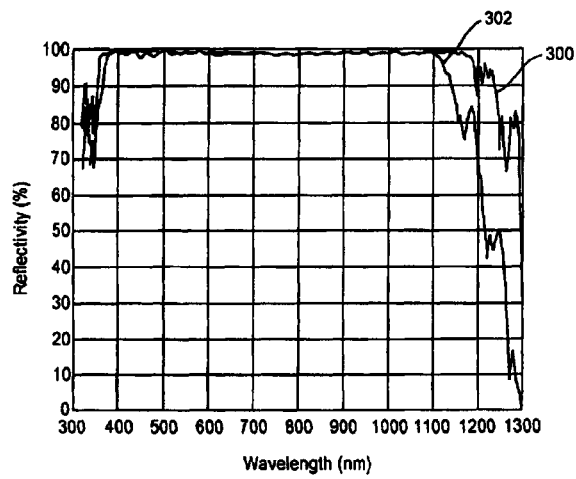

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-18 is confirmed.

New claims 33 and 34 are added and determined to be patentable.

Claims 19-32 were not reexamined.

*33. A mirror comprising:*
*a substrate;*
*and a reflector portion disposed directly on a surface of said substrate, said reflector portion comprising alternating layers of high and low index of refraction material, said layers being configured for reflecting greater than 99% of all wavelengths in a bandwidth of greater than 600 nm at greater than 97.5% reflectivity, where a totality of said bandwidth is between 350 nm 1100 nm.*

*34. A mirror comprising:*

*a substrate;*

*and a reflector portion disposed directly on a surface of said substrate, said reflector portion comprising alternating layers of high and low index of refraction material, said layers being configured for reflecting greater than 99% of all wavelengths in a bandwidth of greater than 500 nm at greater than 97.5% reflectivity, where a totality of said bandwidth is between 350 nm 1100 nm, wherein said layers are configured for reflecting a p-polarization of at least 99% of said wavelenghts in said bandwidth at greater than 97.5% reflectivity for each angle of incidence between 0 degrees and 50 degrees.*

* * * * *